United States Patent [19]

Priegnitz

[11] 4,024,438
[45] May 17, 1977

[54] DELTA PHASE LOSS DETECTOR

[75] Inventor: Robert A. Priegnitz, Algonquin, Ill.

[73] Assignee: Coilcraft, Inc., Cary, Ill.

[22] Filed: Oct. 30, 1975

[21] Appl. No.: 627,345

[52] U.S. Cl. .................................. 361/92; 361/86
[51] Int. Cl.² .................................... H02H 3/24
[58] Field of Search .............. 317/46, 47, 48, 31, 317/33; 340/248 B; 307/130

[56] References Cited
UNITED STATES PATENTS

| | | | |
|---|---|---|---|
| 3,184,644 | 5/1965 | Faglie | 317/46 |
| 3,248,610 | 4/1966 | Faglie | 317/47 X |
| 3,431,467 | 3/1969 | Calfee | 317/47 |
| 3,636,541 | 1/1972 | Genuit et al. | 317/46 X |
| 3,843,908 | 10/1974 | Priegnitz | 317/47 X |

Primary Examiner—J D Miller
Assistant Examiner—Patrick R. Salce
Attorney, Agent, or Firm—Howard H. Rogers, Jr.

[57] ABSTRACT

A phase loss detector for detecting and responding to voltage loss or failure in a polyphase electric power supply to disconnect the load or motor in the event of such loss, which is adapted to serve in conjunction with either a delta or wye power configuration and is characterized by an internally generated AC common line such that a common line of the power source is unnecessary.

9 Claims, 2 Drawing Figures

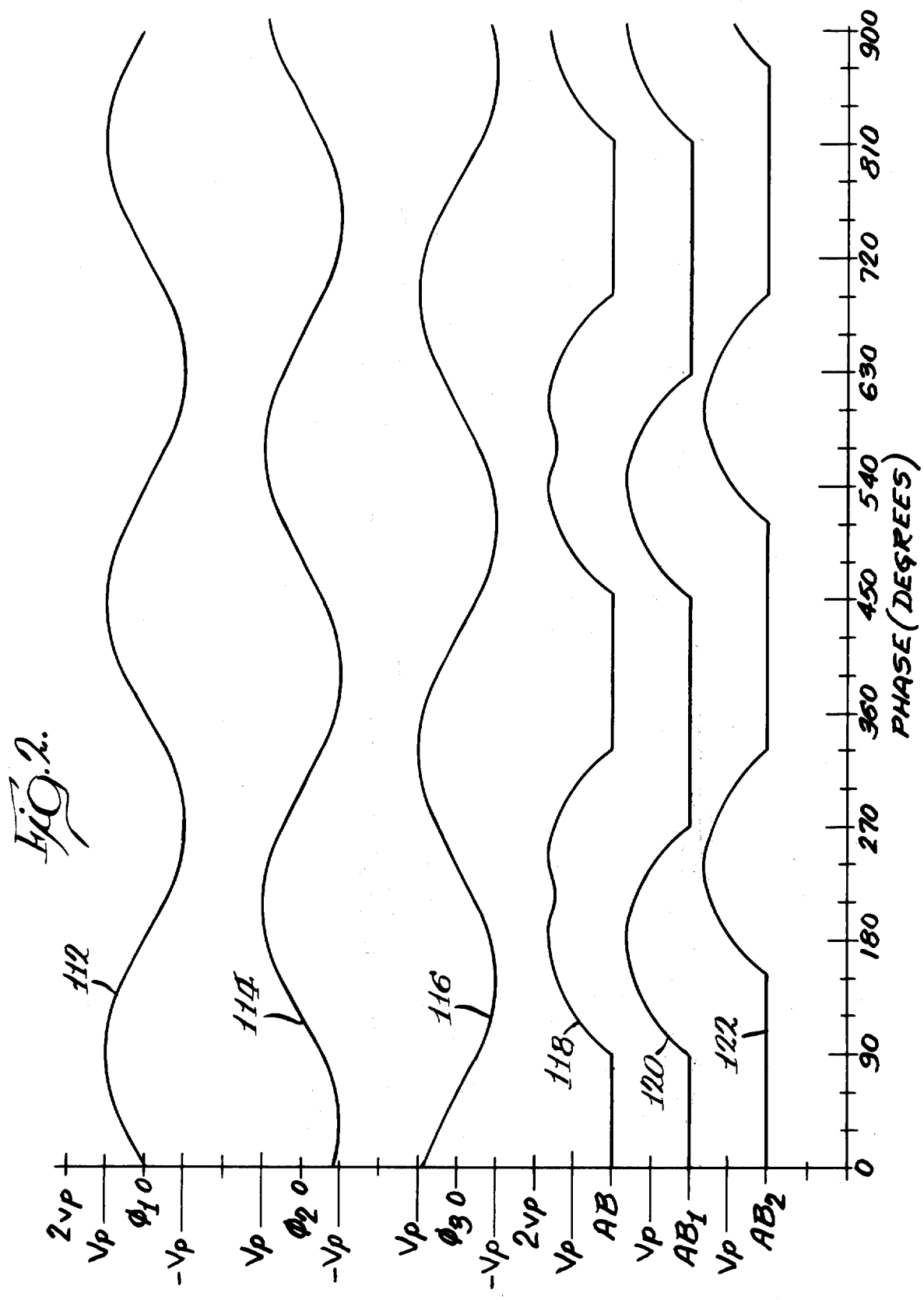

DELTA PHASE LOSS DETECTOR

BACKGROUND OF THE INVENTION

U.S. Pat. No. 3,843,908 issued Oct. 22, 1974 to the inventor here and entitled Voltage Failure Sensing Circuit, discloses a circuit directed to generally the same purpose as the present invention of phase loss detection in a polyphase power system. That circuit, however, is dependent on the presence of an AC common line and thus is adapted for use only in conjunction with a wye configuration with the common line carried to the circuit.

Other U.S. patents directed generally to the matter of phase failure detectors are U.S. Pat. Nos.: 3,155,880; 3,377,551; 3,697,811; 3,160,786; 3,401,308; 3,736,470; 3,184,644; 3,493,783; 3,743,889; 3,248,610; 3,535,589; 3,783,341; 3,302,063; 3,600,665; 3,795,842; 3,328,606; 3,644,789; 3,848,160; 3,369,154; 3,673,502; 3,860,855; 3,866,094.

SUMMARY OF THE INVENTION

The present invention is directed to a phase failure detector circuit for a polyphase power supply wherein each of the power phase lines is diode-connected to an internal line which is thereby constituted a common line. The circuit is illustrated in conjunction with a three phase system. When each phase is properly functional, voltage pulses are delivered through a filter to a transistor switch to maintain energization of a relay which controls a circuit breaker for the load or motor. When the voltage is seriously reduced or lost on any of the phase lines, the pulse amplitude or duration is reduced so that, when filtered, the average value drops below a level sufficient to keep the switch conductive.

The particular advantage of the present invention over that disclosed in the above-mentioned U.S. Pat. No. 3,843,908 is that it serves for a delta configuration power source as well as a wye configuration.

The circuit also has economic advantages over similar devices in the art in that transformers and high voltage capacitors, both commonly required expensive components, are avoided and it employs fewer and simpler components. In short, the present circuit teaches an inexpensive yet effective phase loss sensing circuit for either delta or wye polyphase power sources.

BRIEF DESCRIPTION OF THE DRAWINGS

FIG. 1 is a circuit diagram embodying the present invention and
FIG. 2 is a chart of voltage curves.

DESCRIPTION OF A PREFERRED EMBODIMENT

Figure 1:
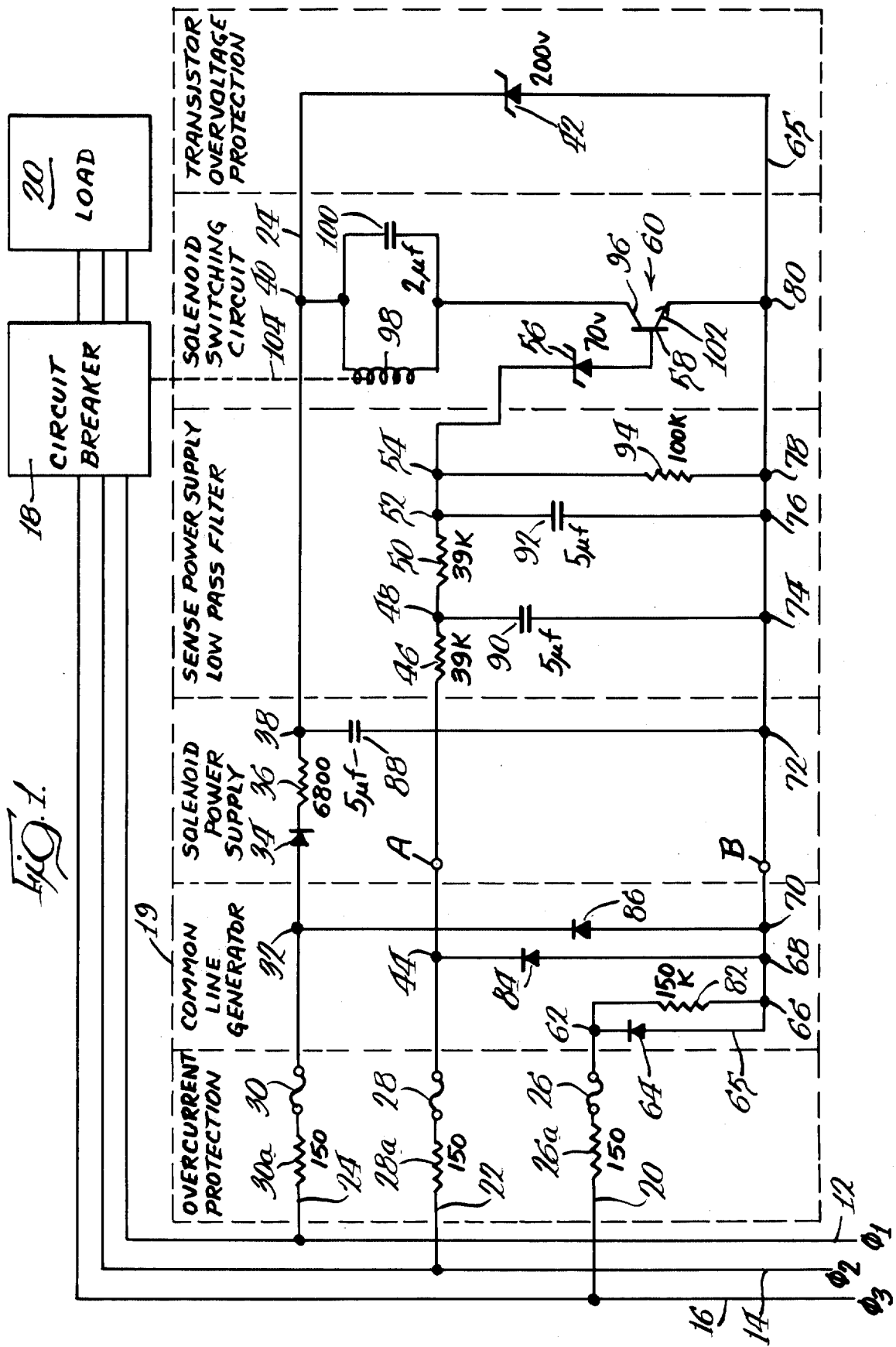

In FIG. 1 is shown three phase power conductors 12, 14, and 16 connected in either a delta or wye configuration. It will be noted that no common line is shown since it is unnecessary in the practice of the present invention. The power lines are connected through a circuit breaker 18 to a load 20. In the present case, the values described are those pertinent to a 208 volt phast-to-phase wye supply. The circuit, however, can operate off any delta or wye supply of any voltage with a corresponding change in element values.

The phase failure detector 19, enclosed in the dotted lines has an input line connected to each of the phase lines: line 20 connected to phase line 12, line 22 connected to phase line 14, and line 24 connected to phase line 16. Its utility for a delta configured power source is evidenced by the absence of a showing of a neutral line. Each of the input lines are fused as at 26, 28, and 30. The 150 ohm resistances 26a, 28a, and 30a indicated on the drawings are the resistances of the fuses.

Line 24 extends through fuse 30, through a terminal 32, and to the anode of a diode 34. The line 24 continues from the cathode of diode 34 through a 6800 ohm resistor 36, a terminal 38, a terminal 40, and thence to the cathode of a 200 volt zener diode 42.

Line 22 extends through fuse 28, through terminal 44, through a 39K resistor 46, a terminal 48, a second 39K resistor 50, a terminal 52, a terminal 54, and to the cathode of a 70 volt zener diode 56. The line 22 continues from the anode of the zener diode 56 to the base 58 of a transistor 60 to be later described.

Line 20 extends from the fuse 26 through a terminal 62 to the cathode of a diode 64. From the anode of diode 64, line 65 extends through terminal 66, terminal 68, terminal 70, terminal 72, terminal 74, terminal 76, terminal 78, terminal 80, and to the anode of zener diode 42.

A 150K resistor 82 is connected between terminal 62 and 66 in parallel with the diode 64. Terminal 44 of line 22 is connected to the cathode of a diode 84, the anode of which is connected to terminal 68. Terminal 32 of line 24 is connected to the cathode of a diode 86, the anode of which is connected to terminal 70. Terminal 38 of line 24 is connected to terminal 72 through 5uf capacitor 88. Terminals 48 and 52 of line 22 are connected through 5uf capacitors 90 and 92 to terminals 74 and 76 respectively. Terminal 54 of line 22 is connected through a 100K resistor 94 to terminal 78. Terminal 40 of line 24 is connected to the collector 96 of transistor 60 through a relay winding 98. A 2uf capacitor 100 is connected in parallel across the relay winding 98. The emitter 102 of transistor 60 is connected to terminal 80. The armature 104 of relay 98 is connected to operate the circuit breaker 18.

For convenience and ease of understanding, the circuit has been divided into functional sections: (1) Overcurrent Protection or Fusing; (2) Common Line Generator; (3) Solenoid Power Supply; (4) Sense Power Supply; (5) Solenoid Switching Circuit; and (6) Transistor Overvoltage Protection. The specific functions of each of these sections appears below.

The operation of the device is as follows. The circuit breaker 18 will open when the relay winding 98 is deenergized. The relay will be continuously energized as long as the transistor 60 is biased for conduction. The biasing for conduction is achieved through a continuous voltage applied to the base 58 of the transistor 60. This biasing is achieved through the zener diode 56 which has a threshold value of 70 volts. Therefore, as long as a voltage in excess of 70 volts appears across the zener diode, the circuit breaker 18 will remain closed.

The resistors 46 and 50 and the capacitors 90 and 92 constitute a ladder type low pass filter to convert voltage pulses into an average value steady state DC. The resistor 94, in conjunction with the resistors 46 and 50 constitutes a voltage divider to reduce the voltage applied to the zener diode 56 to a normal value slightly above threshold.

Diode 34, resistor 36 and capacitor 88 constitute the power supply for the circuit-breaker-actuating relay 98 which is controlled by the transistor 60. The blocking diode 34 supplies pulsating DC which is filtered by the RC filter, resistor 36 and capacitor 88, to provide relatively steady DC to the relay winding.

It will thus be appreciated that the voltage drop between lines 24 and 65 will power the relay 98 and the voltage drop across lines 22 and 65 will actuate the transistor switch for the relay energization.

In FIG. 2 are shown the phase voltage curves 112, 114, and 116 of lines 12, 14, and 16 respectively, and the pulse waveforms derived from them. It will be noted that each of these curves 112, 114, and 116, is 120° out of phase with respect to either of the other two lines. Assuming now the points marked A on line 22 and B on line 65 as voltage reference points, whenever the voltage at point A is positive with respect to point B, positive current will tend to flow to the cathode of the zener diode 56 and, subject to the barrier of the zener diode, to the base 58 of the transistor, to point B, and thence to the anodes of either or both of the diodes 64 and 86. If the momentary positive voltage on the cathode of either diodes 64 or 86 exceeds the momentary value of the voltage on the anodes thereof, current flow through the diode reflecting that situation will be blocked.

Considering then FIG. 2 and the curves contained therein, each of the phase lines swings between positive peak voltage Vp and negative peak voltage −Vp. Line 22 is connected to phase line 14 and traces curve 114. It will be noted that this line reaches its peak negative voltage at 30° as the full phase cycle is illustrated in FIG. 2. At this point, the voltage 112 of phase line 12 is rising from zero to its positive peak and the voltage 116 of line 16 is descending from its positive peak. Thus, both diodes 64 and 86 are reversely biased, and no current flows. Points A and B are at the same potential through terminal 44 and diode 84 so there is no voltage drop. Curve 118 marked AB represents the voltage reading across points A and B as the circuit functions normally with all phase lines 12, 14, and 16 conducting properly. The zero voltage at 30° will be noted.

At 90°, the voltage in line 14 is rising toward zero and the voltage of phase line 16 is descending from zero toward its negative peak such that the voltage values of the two lines are approximately equal. Thereafter, as phase line 14 voltage rises and the phase line 16 voltage falls, diode 64 becomes forwardly biased and the voltage across the points A and B begins to rise. As the voltage curves diverge, line 14 in the positive direction and line 16 in the negative direction, the voltage differential climbs. Note curve 118 from 90° to 180°.

At about 150° on the phase cycle, the positive voltage of line 14 is equal to the voltage of line 12, with line 14 rising to its positive peak and line 12 falling. This has the effect of forwardly biasing diode 86, and thus both diodes 82 and 86 become conductive.

At 180° on the cycle, the voltage differential between lines 14 and 16 reaches an approximate maximum of about 1.7 peak voltage, as shown by the first peak in curve 118, and diminishes thereafter.

At 210°, the differential between lines 14 and 16 has dropped to about 1.5 peak voltage, but the differential between line 14 and line 12 has risen to about that same level and the latter difference continues to increase to 240°. Thus, another 1.7 voltage peak value is established between lines 14 and 12.

At 270°, the positive voltage difference between lines 14 and 16 has dropped to zero and thus diode 64 is at the moment of being reversely biased and nonconductive. At 330°, the differential between lines 14 and 12 has dropped to zero and thus diode 86 is at the moment of becoming reversely biased. From 330° to 450°, both the diodes 64 and 86 are reversely biased and therefore no potential difference appears across the points A and B. The curve 118 therefore is flat at zero potential difference.

When phase line 12 is open, the positive voltage rise between points A and B attributable to the differential between it and line 14 will be lost. In such case, the voltage curve will appear as in curve 120. It will be appreciated that the area under the curve of positive voltage pulses of curve 120 is substantially less than that of curve 118. Similarly, if line 16 is open, the positive voltage curve attributable to the potential difference between it and line 14 will disappear and the result will be shown in curve 122. Again, the pulse areas under the curve will be substantially less than in the case of curve 118.

If line 14 is open, the source of the positive voltage pulses in relation to either lines 12 or 16 is lost.

By mathematical analysis, the average or DC value of the waveform of curve 118 has been determined to be approximately 0.82 of the voltage peak of any of the phases with respect to the AC common or line 65. The average value of the waveforms of curves 120 or 122 is only about 0.55 peak voltage.

The low pass filter consisting of the resistors 46 and 50 and the capacitors 90 and 92 serve to convert the waveform 118 (or the waveforms 120 or 122) into steady state DC. Resistor 94, in conjunction with the resistors 46 and 50 reduces the theoretical steady state DC voltage derived from curve 118 from a value of about 140 volts to a value of about 79 volts. Since the zener diode 56 has a threshold of 70 volts, positive voltage is applied to the base 58 of the transistor 60 making it conductive and energizing the solenoid winding 98, so maintaining the circuit breaker 18 in a closed condition. The voltage of the curves 120 and 122, averaged and divided, results in the applicatiom of about 53 volts to the zener diode 56. This voltage falling short of the zener threshold, the transistor 60 is not biased for conduction, and the relay winding 98 is deenergized, so opening the circuit breaker 18.

In the particular circuit described, the voltage divider network 46, 50, 94, is not essential in that a zener diode having a threshold of about 130 volts could be used instead of the described zener 56 and divider. Since this circuit conception, however, is applicable to any power source including a 480 volt source, and since zeners have a maximum threshold of about 200 volts, the absence of a voltage divider would grossly overload the transistor in that high voltage context. The voltage divider is shown, therefore, to fit the general case, and an appropriately low threshold zener provided.

The capacitor 100 connected across the relay winding 98 bypasses and dissipates transients arising from the interruption of current through the winding. The zener diode 42 with a threshold of 200 volts protects the transistor 60 against voltages in excess of that figure.

The 150K resistor 82 is provided to facilitate the discharge of capacitor 88. When the transistor switch 60 is nonconductive, lines 24 and 20 are isolated from each other. The diodes 64, 84, 86 are oriented to be nonconductive with respect to the charge developed in the capacitor 88. The resistor 82 bypasses diode 64 and thus permits a discharge of the capacitor to line 20.

Although the operation of the device has been described in terms of the loss of any one of the phases affecting the voltage applied to the zener 56, it might be thought that certain of the phases, if open, would deenergize the relay coil 98 by simple power failure. Thus, if line 12 is open, it would seem no provision remains for energizing the coil. Likewise, if line 22 is open, it would seem no provision remains for forwardly biasing the transistor 60 and thus current through the relay coil is interrupted. However, when one of the phase lines is open, the load or motor is apt to function as a generator with respect to that open line and thus a voltage may appear on that line, although value of the voltage will not be the equal of the nominal applied voltage.

It will be appreciated that the operation of this device depends on the voltage across lines 22 and 65 as shown in curve 118 having an average DC value narrowly in excess of the threshold of the zener diode 56. The zener can be selected as close to that average value as may be desired. In view of power supply fluctuations such power company cutbacks in times of extraordinary use or shorter lived phenomena, the diode threshold should permit minor variations. As will be appreciated from curve 118, however, a voltage reduction on all or any of the three pase lines will result in a diminution in the amplitude of the positive voltage pulses; thus a diminution of the area under curve 118; and hence a reduction in the average value thereof. When the average value falls below 70 volts across the zener diode 56, the device operates as described to open the circuit breaker. A diminution of the voltage on any of the three phases by 15% will cause the voltage to drop below the zener threshold.

The operation of the circuit is not phase dependent; the power supply adjuncts of line 24 and the sensing adjuncts of line 22 could be exchanged without affecting the operation of the device.

Finally, the circuit is fail-safe. Should any line or any circuit component fail, either the bias on the transistor or the powering of the relay winding will be interrupted and the circuit breaker thus released to open.

It will, of course, be appreciated that other signalling devices such as warning lights, audible signals, etc. may be inserted into line 24 in place of or in addition to the circuit-breaker-controlling relay 98, or they may be external to the detector circuit 19 and actuated by relay 98.

I claim:

1. A circuit for sensing voltage loss or failure in any or all conductors of a multiphase conductor power supply, comprising an internal common line, like oriented diodes connecting each of said conductors to said line, a second line connecting one of said phase conductors to said common line in parallel with the diode connecting said one conductor to said common line and having therein electronic switching means with a control element, a third line connecting a second of said phase conductors to said control element in parallel with the diode connecting said second conductor to said common line, said third line developing voltage pulses therein with respect to said common line when the voltage in said third line exceeds the voltage across any of the diodes connecting the other phase conductors to said common line in the conductive direction, said pulses being proportional in amplitude and duration to said excess, filter means in said third line for converting said pulses into an averaging, approximately steady state DC, and voltage barrier means between said filter and said control element requiring more than a predetermined minimum voltage thereacross to maintain said switching means in a conductive condition.

2. The combination of claim 1 wherein said barrier means is a zener diode having a threshold narrowly below said DC voltage when said phase conductors are each carrying full rated voltage.

3. The combination of claim 1 wherein said multiphase conductor power supply is three phase.

4. The combination of claim 1 wherein said second line includes a relay in circuit control relationship with a multiphase load connected to said power supply.

5. The combination of claim 1 wherein said electronic switching means is a transistor, said control element is the base thereof, and voltage above said barrier biases said transistor for conduction.

6. The combination of claim 2 wherein said electronic switching means is a transistor, said control element is the base thereof, and voltage above said threshold biases said transistor for conduction.

7. The combination of claim 2 wherein said third line includes a voltage divider to lower the voltage applied to zener diode and said diode has a threshold narrowly below said lowered voltage as derived from said phase conductors when said phase conductors are each carrying full rated voltage.

8. The combination of claim 1 wherein said second line includes means for supplying relatively steady state DC to said switching means.

9. The combination of claim 1 wherein said third line includes a voltage divider and said barrier means is a zener diode having a threshold narrowly below the output of said filter and said voltage divider when said phase conductors are each carrying full rated voltage.

* * * * *